United States Patent [19]

Hase

[11] 4,320,333
[45] Mar. 16, 1982

[54] BATTERY CHARGER AND SURVEILLANCE SYSTEM

[76] Inventor: Alfred M. Hase, 6 Manorwood Rd., Scarborough, Ontario, Canada

[21] Appl. No.: 77,030

[22] Filed: Sep. 19, 1979

[51] Int. Cl.³ .................... H02J 7/04; H01M 10/44
[52] U.S. Cl. .................... 320/43; 320/23; 320/31; 320/39; 320/48
[58] Field of Search ............ 320/43, 48, 20, 21, 320/22, 23, 24, 30, 31, 32, 37, 38, 39, 40

[56] References Cited

U.S. PATENT DOCUMENTS

| | | | |
|---|---|---|---|
| 3,553,561 | 1/1971 | Lesher | 320/48 X |
| 3,626,270 | 12/1971 | Burkett et al. | 320/40 X |
| 3,733,534 | 5/1973 | Saslow | 320/39 X |
| 3,835,362 | 9/1974 | Greene | 320/31 X |
| 3,848,173 | 11/1974 | Hase | 320/23 |
| 3,969,667 | 7/1976 | McWilliams | 320/43 X |
| 4,091,320 | 5/1978 | Foster | 320/37 X |
| 4,191,918 | 3/1980 | Nicholls | 320/37 X |

FOREIGN PATENT DOCUMENTS

822798 9/1969 Canada.

Primary Examiner—Gene Z. Rubinson
Assistant Examiner—Richard M. Moose

[57] ABSTRACT

A battery charging apparatus has a control circuit which controls the rate of input of AC power through a synchronous switch—a saturable core reactor, magnetic amplifier or a pair of anti-parallel silicon controlled rectifiers. The operation of the charger is such that the length of the charging program can be predetermined, and when the charging program is initiated a surveillance system functions to determine that the charging current during the program, and particularly at the end of the program, is within anticipated limits. If the charging current is not within anticipated limits, an alarm indicator is latched on, giving the operator an indication of potential battery problems, and/or an indication of a battery/charger mismatch whereby one is over or under rated with respect to the other.

4 Claims, 3 Drawing Figures

BATTERY CHARGER AND SURVEILLANCE SYSTEM

FIELD OF THE INVENTION

This invention relates to storage battery charging apparatus, and more particularly the invention relates to battery chargers which have taper charge characteristics, and which have surveillance of the battery charge program such that an unanticipated battery charging operation is noted and annunciated. By such surveillance, incipient battery problems may be determined before any real damage has occurred, as well as incorrect or improper battery/charger matching for battery charge operations.

BACKGROUND OF THE INVENTION

Heavy duty industrial battery chargers are employed in many different types of operations—such as heavy industry, food processing and storage, etc.—all of which may use "industrial trucks" such as battery-powered pallet tractors, fork lift trucks, etc. The batteries in such industrial trucks may have amp-hour ratings of from 200 amp-hours to 1,800 amp-hours, and they may have anywhere from six to 36 cells. Such storage batteries are of the lead-acid type, and usually have a terminal voltage per cell, when fully charged, of from 2.4 to 2.6 volts. During use, an industrial storage battery or bank of storage batteries in an industrial truck may have its charge reduced virtually to zero; but such fully discharged battery may be required for use the following day, so that it may be fully recharged in the shortest possible time and without overheating. Thus, the need exists for battery chargers having suitable charging characteristics, and sufficient charging rates and voltages. Normally, however, an industrial battery charger is specifically designed only for batteries having one particular amp-hour rating; and such industrial battery chargers are adapted to recharge or back-charge a storage battery of the designated size and rating in a given period of time—usually 8 to 12 hours.

Several modes of operation of industrial battery chargers have been particularly followed in the past. Very often, industrial battery charges have provided a constant current, whereby a charging current is delivered to a storage battery at a substantially constant rate. Most often, such constant current battery chargers have operated at two charging rates, a high initial charging rate and a low final charging rate.

The other general mode of operation of industrial battery charges has been taper charging, which is characterized by an initially very high charging current output which tapers because of the nature of the current output control within the charger until a specific voltage per cell of the battery is reached, whereupon a low-current output characteristic of the charger is initiated. In the past, the monitoring and transfer circuitry of a tapered characteristic battery charger which initiates the transfer from high to low current output was essentially the same as in a constant current charger, i.e. the transfer from high to low output current is a step function of the charger. The output current during low-current operation of a taper charger according to the prior art is generally controlled by a ballast resistor or linear reactor; and taper chargers as well as constant current chargers are also usually equipped with a total shut-off at a given time, so as to avoid overcharging the storage battery.

More recently, the present inventor has provided a battery charging apparatus which has recognized that during the early stages of recharging a storage battery, constant current high level charging provides the best performance—with the best protection for the battery—and at the same time precludes high DC shocks to the battery and excessively high power consumption. Accordingly, the present inventor has provided a prior art battery charger which has an initial constant, high current output, which then transfers to a taper (constant voltage) output, and finally a trickle charge. Such a charger is described in detail in my U.S. Pat. No. 3,848,173, issued Nov. 12, 1974.

One drawback of most prior art battery chargers has been the fact that, although suitable temperature compensating circuitry, line regulation circuitry, etc., can be inserted in a charger, the circuits and relays which control the step transfer from high to low output—or which control the termination of taper charging—must be essentially fail-safe in order to assure that the transfer to low current output occurs. Unfortunately, such equipment can be easily triggered by a vibration or shock, so that the step transfer may be initiated much too early; and if that occurs, a full charge of the storage battery is not achieved. Otherwise, the fail-safe characteristics and features may be overridden thereby leading to a potentially dangerous over charging operation of the battery.

As noted, storage batteries, and particularly industrial storage batteries, may have considerably different sizes and amp-hour ratings, which require different charging rates; but the principal remains that a constant potential charging mode which transfers the operation of the storage battery charging apparatus from a high level to a low level or to a trickle charging mode, provides the greatest protection for storage batteries having the designated ratings for which any one storage battery charging apparatus may be adapted. This invention, therefor, provides means by which storage batteries having the same voltage ratings but somewhat different amp-hour ratings than the name plate rating of the charger—up to 200%—may also be charged by any one specific charger, within limits, by altering certain of the control characteristics and parameters of the charger.

The present invention also recognizes that the owners and operators of battery powered industrial equipment whose batteries are being charged by battery chargers according to the present invention may wish to know, as early as possible, if there is an incipient failure of their industrial batteries, before any substantial damage may occur or a potentially dangerous situation concerning the installation and operation of the battery may occur.

Accordingly, the present invention provides a battery charging apparatus which also functions as a surveillance system whereby the state of a battery of known name plate characteristics (i.e., terminal voltage and amp-hour rating) may be determined particularly if it is beyond normal limits; and at the same time, a battery charging apparatus is provided whereby a visual—and, if necessary, audible—signal is given and which may not be cancelled or overridden by the apparatus, thereby reasonably assuring that an operator check of the battery will follow.

Improved battery charged circuitry is provided by the present invention, particularly having regard to energy efficient solid state devices and transformers, etc.

Further, improvements are provided whereby the operating condition of the battery charger, in association with a battery of known rating, may be under constant surveillance irrespective of the ambient temperature, age of the battery, state of sulphation of the battery, etc. so long as the overall characteristics of the battery are within predetermined but fairly broadly set limits.

BRIEF DESCRIPTION OF THE DRAWINGS

These and other features and objects of the invention are more clearly described hereafter, in association with the accompanying drawings, in which.

DESCRIPTION OF THE PREFERRED EMBODIMENTS

Figure 1:
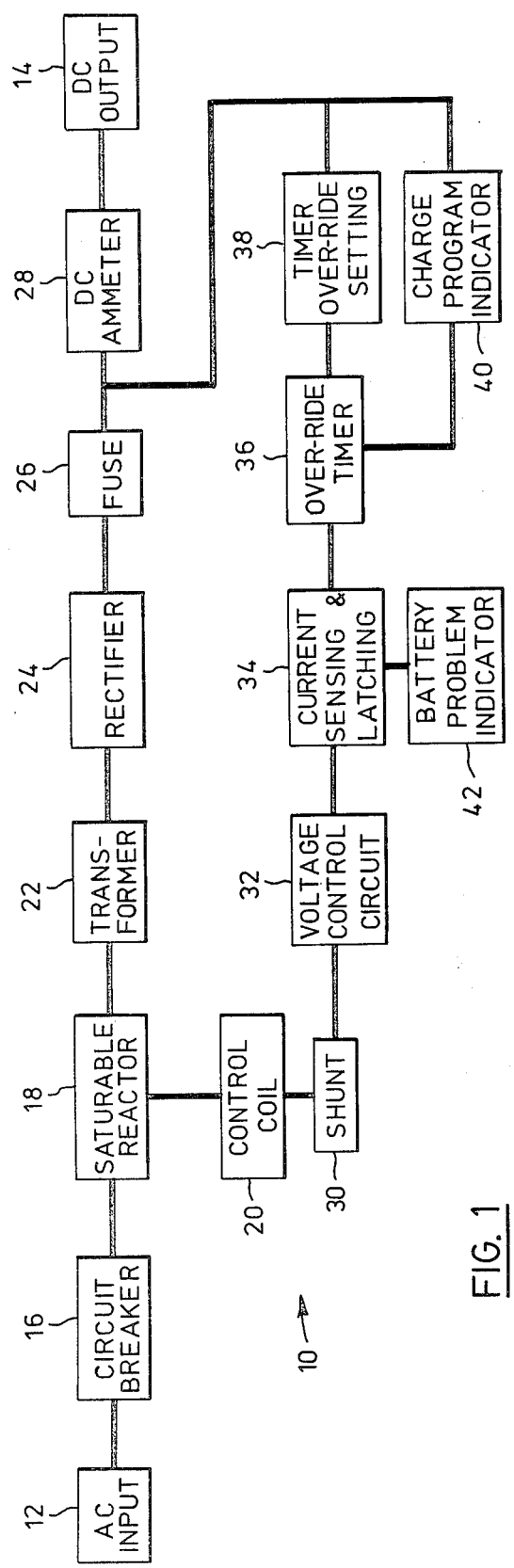
FIG. 1 is a single line block circuit diagram showing the basic circuitry of a storage battery charger according to the present invention.

In general, a battery charging apparatus in accordance with the present invention has a block or functional circuit as shown in FIG. 1. The apparatus 10 is adapted at its input for connection to an alternating current source of electrical energy 12, and has a direct current output 14 which is adapted to be connected to the terminals of the storage battery to be charged. In the input section of the battery charging apparatus, there is a circuit breaker 16, an ampere-turns transductor—such as a saturable core reactor or magnetic amplifier, or the equivalent SCR circuitry—indicated at 18. In any event, the saturable reactor (or equivalent) is of the sort which has a control coil 20, as discussed hereafter. So as to provide the correct voltage at the output, a transformer 22 is provided; and a full wave rectifier 24 has a direct current output which is connected through fuse 26 and a DC ammeter 28 to the DC output section of the battery charging apparatus 10.

The control coil 20 of the saturable reactor 18 is, itself, controlled by a shunt 30 in the manner discussed hereafter—and generally as taught in applicant's prior Canadian Pat. No. 822,798 issued Sept. 9, 1969. The shunt 30 is itself controlled by a voltage control circuit 32 as discussed in greater detail hereinafter; and the voltage control circuit 32 is connected through a current sensing and latching circuit 34 and override timer circuit 36 to a timer override setting circuit 38. A charge program indicator 40 is connected across the timer override circuit 38 to the override timer 36, and a battery problem indicator 42 is connected to the current sensing and latching circuit 34 so as to give the requisite indication when required, as discussed hereafter.

Broadly stated, the saturable reactor 18 has its control coil 20, and the operation of the control coil 20 is such as to affect the rate of electrical energy input to the transformer 22 and thence to the output stages. The rate of electrical energy input is determined by the state of conductance of the control coil 20, and the period of such conductance. Thus, when the power input reduces under the influence of the control coil 20, whose conductance is controlled in the manner discussed hereafter, it may be considered that the average period of the conductance of the control coil is reducing.

The timer override setting circuit 38 simply provides the opportunity to set the amount of time over which the charge program will operate. Generally, a charge program is set for 8 hours—and at such setting, the name plate rating of the battery charging apparatus should substantially match the name plate rating of the battery; i.e., the rated terminal voltage of the battery charging apparatus and the nominal terminal voltage, fully charged, of the battery would be identical, and the amp/hour rating or capacity of the battery would be such that it can be fully charged in the designated period. Sufficient additional settings are provided, however, to permit batteries having greater amp/hour ratings to be charged by the same apparatus, if the voltage and charging current of the battery charging apparatus 10 are otherwise acceptable. Thus, where a sufficient period of time exists, and the battery is not required to be put into operation after only approximately 8 hours, periods of 12 or 16 hours may be provided by suitable settings of the timer override setting circuit 38.

The override timer timer circuitry 36 provides the timing function, as controlled by the timer override setting 38, and the timer is generally an integrated circuit having a specific characteristic such that, when the predetermined charging period expires, a signal is given off one of the terminals of the timer to override the voltage control circuit 32, and thereby to turn the shunt 30 off. It must be noted that the current sensing and latching circuit 34 is connected to the override timer 36, and is arranged in such a manner as to sense the voltage across the control coil 20 (which, as a DC voltage, is proportional to the charging current), so that surveillance of the charge program is undertaken. When charging currents are sensed which are beyond what is expected in the control coil 20—during the initial high level constant current charging, during the taper charging to low current charging, or at the end of the charging program—an indication is made by annunciation at the battery problem indicator 42. Such indication is generally a visual signal as discussed hereafter, or may be an audible signal such as a tone or buzzer being set in operation; and in any event, annunciation of the battery problem indicator 42 is indicative of the possible or incipient problem with the battery or of a mismatched battery/charger combination.

Figure 2:
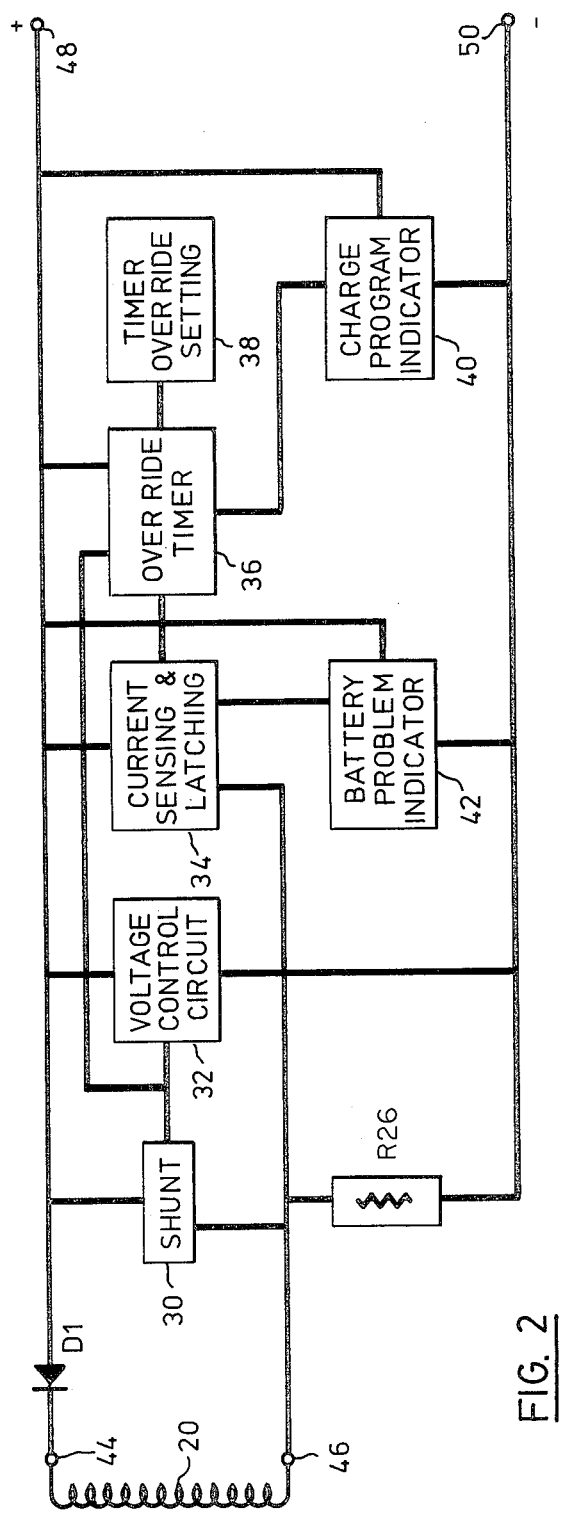
FIG. 2 is a two-line, functional block circuit diagram of the principal control module of a device according to the present invention.
Figure 3:
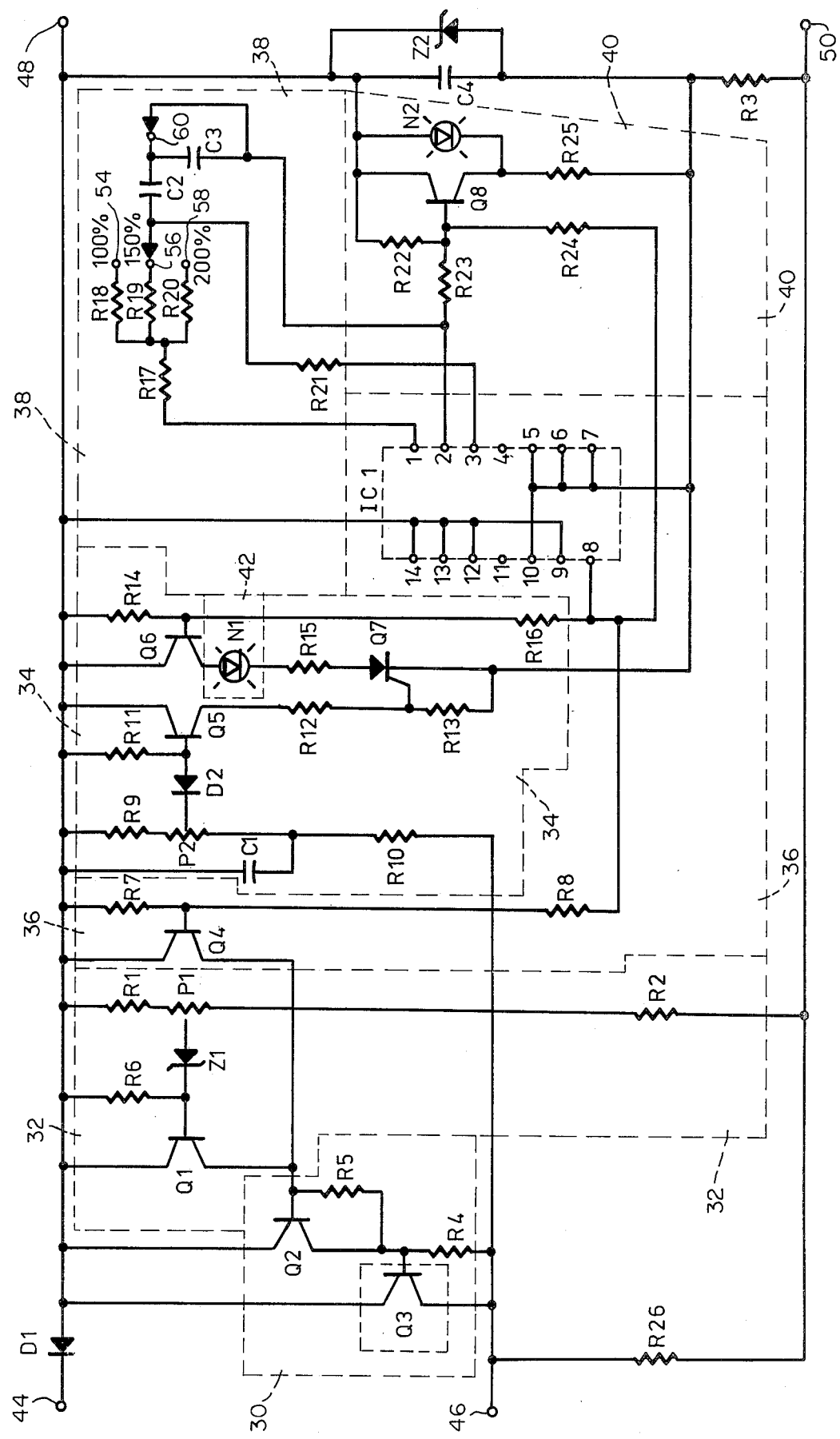
FIG. 3 is a typical schematic circuit of the control module of an industrial battery charger, according to the present invention.

Turning to FIGS. 2 and 3, these are a functional block circuit diagram and a typical circuit diagram of specific indicated and identified portions of the circuit of FIG. 1, and they have been included to more specifically describe the present invention and to show a typical commercial circuit arrangement. Thus, it will be noted that the control coil 20 is connected across terminals 44 and 46, and that terminal 44 is connected through to the positive DC terminal 48, with diode D1 connected between them.

During normal operation, one of the resistors R18, R19 or R20 is connected at their respective terminals 54, 56 or 58—which terminals are external—to the leads coming from the common point of capacitor C2 and resistor R21, so that the timer override setting 38 for the battery charging apparatus may be determined, and the operation of the override timer 36 may be set, for an interval of time by which a battery of specific amp/hour rating of 100%, 150% or 200% of the name plate rating of the charger, may be charged. As indicated above, a battery having 100% by the name plate rating would be charged in 8 hours, whereas the other two settings would result in charging times of 12 hours or 16 hours, respectively.

Once having determined the timer override setting, the battery charging apparatus is put into operation, whereby the override timer 36 which includes the integrated circuit IC-1 becomes operative. The operation of the battery charging apparatus is under constance surveillance of the current sensing circuits 34, whose output is compared by IC-1; and if the output is too high, a signal from the timer latches the current sensing and latching circuits 34 on at SCR Q7, so that the battery problem indicator 42 annunciator lamp N1 is illuminated. Obviously, the SCR Q7 will remain latched in its conductive state until corrective action is taken—usually by opening an external terminal 60 which unpowers the timer circuit and the latch of the SCR Q7.

In normal operation, however, the SCR Q7 remains non-conductive and lamp N1 is not illuminated. However, a pulse circuit which includes the resistors R17 and R21, and the amplifier based on transistor Q8, operates to illuminate lamp N2 in a flashing fashion, thereby indicating normal operation of the circuits by annunciation of the charge program indicator 40.

As noted above, the current sensing and latching circuit 34 senses the voltage across terminals 44 and 46, which voltage is proportional to the charging current being delivered by the battery charging apparatus. If only the DC terminal voltage across terminals 48 to 50 were being sensed, that voltage is one which varies with temperature, the age of the battery, the state of sulphation of the battery, the specific gravity of the electrolyte and the electrolyte level, and other similar battery-related matters. All of those matters are not being sensed, and as the terminal voltage of the battery during charging may be affected by those matters, sensing only the terminal voltage of the battery may be misleading.

However, by sensing the voltage across terminals 44 and 46—i.e., across the control coil 20 of the saturable reactor 18, and having in mind that such sensing is relevant to the average period of conductance of the control coil, then the charging characteristic of the battery can be under surveillance; and at the same time a battery/charger mismatch can be determined because in such a mismatch, the operation of the charger would be beyond the normal limits of operation which would be anticipated if the battery were properly matched to the name plate ratings of the charger. Especially, an incipient battery problem can be determined, as well as a failed battery.

The voltage control circuit 32 functions to control the operation of the shunt circuit 30, whereby the trigger rate of the control coil 20 becomes a function of the circuit characteristic determined by diode D1 and the saturation level of transistor Q3—or Darlington pair Q2 and Q3—when operating against the voltage design characteristic of the control coil 20.

Unexpectedly, by operation of circuits as set out in FIGS. 2 and 3, an off-nominal condition of the battery or the battery/charger combination, can be determined and that off-nominal condition will be annunciated by triggering the latching portion (SCR Q7) of the current sensing and latching circuit 34, thereby causing the battery problem indicator 42 to give the required visual (or audible) signal.

At the end of the normal charging procedure, the voltage control circuit 32 is driven off, and the shunt transistor Q3 is saturated. A trickle charge is maintained to the terminals 48 and 50 by operation of the control coil 20 due to the difference of the voltage drops across the control shunt and across the diode D1. At the same time, the flashing lamp N2 in the charge program indicator 40 ceases to be illuminated.

Preferably the transformer 22 is one which has bifilar windings, for energy efficiency purposes. Likewise, the use of energy efficient solid state devices, and the elimination of mechanical clock operated switching and timing devices which are driven by small electric motors, enhances the energy efficiency of the battery charger.

The above discussion has related to a battery charger which provides constant surveillance of the battery charging operation, and thereby surveillance of the status of the battery being charged, so that incipient battery problems may be sensed, and as well so as to indicate severe battery/charger mismatch combinations. A commercial circuit has been shown, in respect of a particular operating model of battery charger according to this invention, but the circuits are illustrative and not definitive as to the precise manner of presentation thereof. The functional block diagrams which have been shown are with respect to the general layout of circuits according to the present invention, and specific circuit integers would be chosen according to the operating characteristic of the charger with respect to its name plate ratings, all within the meaning and ambit of the appended claims.

The embodiments of the invention in which an exclusive property or privilege is claimed are defined as follows:

1. Storage battery charging apparatus which is adapted at its input for connection to a source of electrical energy, and at its output to the terminals of a storage battery; where said apparatus includes controllable synchronous switch means adapted to control the rate of electrical energy input to a battery to which said apparatus is connected; said apparatus having a multirate charging current output program, including a controlled and tapered transition from a high to a low charging rate, and a continuous, constant current trickle charging rate at the end of the program until said battery is disconnected or the charging program is otherwise terminated; and where:
   (a) said apparatus further includes control circuit means (32) to drive said controllable synchronous switch means so as to reduce the rate of electrical energy input to said battery by controlling the operating period of said synchronous switch until such time that the controlled operation period of said synchronous switch reduces to a predetermined minimum period, or until expiration of a predetermined amount of time from the beginning of said multirate charging current output program as determined by an override timer circuit (36), whose operation is initiated at the beginning of said multirate charging current output program: and
   (b) said apparatus further includes circuits for monitoring and providing a real time, full time, surveillance of said control circuit operation, including
      (i) a timer override setting circuit means (38) to set a predetermined length of time for said multirate charging current output program;
      (ii) a charge program indicator circuit (40) having a lamp which continuously gives a visual signal of the continuing operation of said multirate charging current output program during said predetermined length of time;

(iii) a current sensing and latching circuit (34) having means which continuously monitors the operation of said control circuit by sensing the operating current thereof, and comparing said sensed operating current with a reference signal indicative of the anticipated operating current at each instant of time during said charging program, or after the termination thereof; said current sensing and latching circuit further including a latch means adapted to close, and to remain closed until unlatched, when an operating current condition is sensed which is not equivalent to said reference signal at that particular instant of time; and (iv) alarm annunicator circuit including a battery problem indicator circuit (42) associated with the said latch means of said current sensing and latching circuit and adapted to be triggered thereby if the sensed operating current differs from the anticipated operating current; and a lamp for giving a visual signal when said battery problem indicator circuit is triggered.

2. The storage battery charging apparatus of claim 1, where said override timer circuit and timer override setting circuit each function to override said control circuit so as to reduce the output current to a continuous constant trickle charging current at the termination of a charging program; and to drive said charge program indicator circuit off.

3. The storage battery charger apparatus of claim 1 where said controllable synchronous switch means is an ampere-turns transductor having a control coil; and where said means to drive said controllable synchronous switch includes a shunt circuit (30) parallel to said control coil of said ampere-turns transductor, having at least one transistor in shunt connection across said control coil; said voltage control circuit means (32) being connected to drive the base of said at least one transistor so as to control the saturation level thereof, and thereby so as to control the trigger rate of said controllable synchronous switch, until said transistor base is driven substantially to full saturation.

4. The storage battery charging apparatus of claim 1 2, or 3, where said timer override setting circuit includes means to alter the predetermined length of time of said multirate charging current output program.

* * * * *